March 4, 1952     B. D. LOUGHLIN     2,588,021
SUPERREGENERATIVE RECEIVER
Filed Sept. 28, 1946
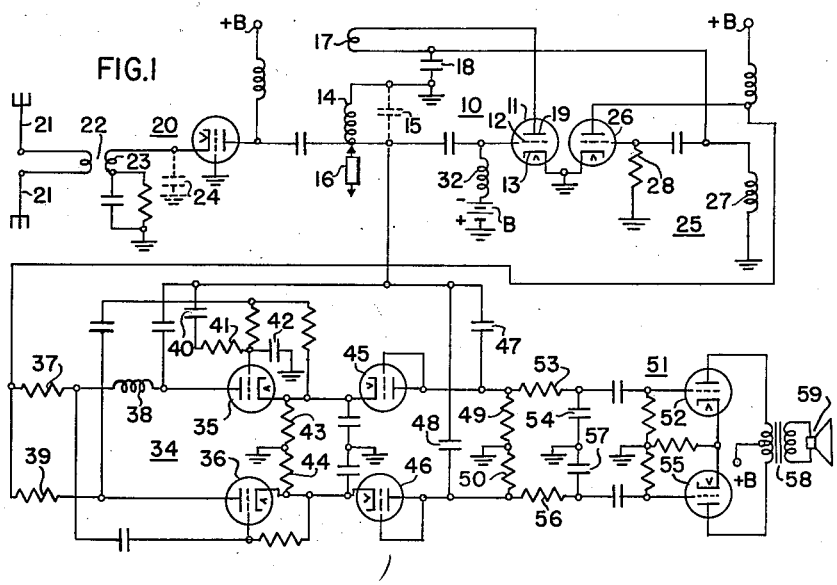
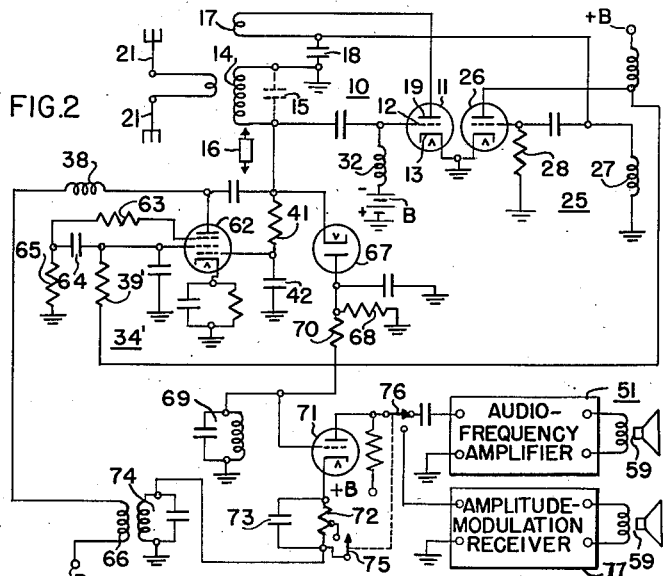
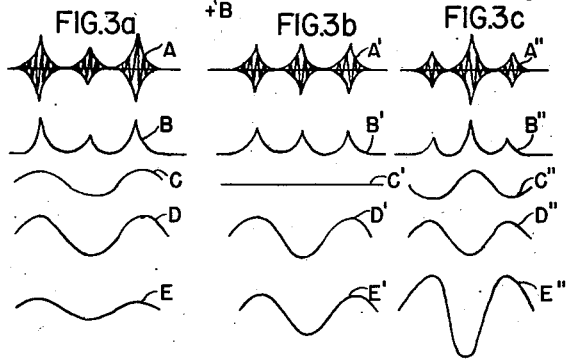
*INVENTOR.*
BERNARD D. LOUGHLIN
BY
*ATTORNEY*

Patented Mar. 4, 1952

2,588,021

UNITED STATES PATENT OFFICE 2,588,021

SUPERREGENERATIVE RECEIVER

Bernard D. Loughlin, Lynbrook, N. Y., assignor to Hazeltine Research, Inc., Chicago, Ill., a corporation of Illinois Application September 28, 1946, Serial No. 700,142

10 Claims. (Cl. 250—20)

The present invention relates to superregenerative receivers and, particularly, to such receivers for receiving an angular-velocity-modulated wave signal.

Superregenerative receivers have the desirable characteristics that they provide exceptionally large amplification of a received wave signal yet are of simple and inexpensive construction. They are particularly suitable for the reception of wave signals having relatively high frequencies of the order of 30 megacycles and above. Certain bands in the high-frequency spectrum are allocated to angular-velocity-modulation transmissions. It has therefore been heretofore proposed that these receivers be employed to receive such angular-velocity-modulated wave signals. An angular-velocity-modulated wave signal, as is well known, is one which is phase- or frequency-modulated in contra-distinction to the amplitude type of modulation. The term "frequency modulation" will be used hereinafter for simplicity, but it is to be understood that the receiver of the present invention is not limited to the reception of frequency-modulated wave signals but may be used to receive phase-modulated wave signals if desired.

The superregenerative frequency-modulation receivers heretofore proposed have utilized two superrgenerators, either synchronously or altering the circuit, in synchronism with the operating periods, and including two regenerator tubes coupled to a single tuned circuit or to individual side-tuned circuits. If a single tuned circuit is used, provision is made for periodically resonating the circuit, in synchronism with the operating periods of the superregenerators, at each of two frequencies equally spaced on either side of the mean frequency of a received frequency-modulated wave signal. The use of two tuned circuits dispenses with the need for periodically shifting the resonant frequency of a single tuned circuit and, in this case, the two tuned circuits are permanently tuned to individual ones of the two side frequencies mentioned. In order that the receiver shall develop no output signal at the mean frequency of the received wave signal, which frequency corresponds to the condition of zero modulation, the two superregenerators are so arranged and adjusted that they develop equal output signals at the wave-signal mean frequency and these output signals are then differentially combined.

Since in the arrangements last described the required balanced operation of the superrengerators may not be easily established and readily maintained under all conditions of operation, or over an extended period of operation it is desirable further to simplify such receivers by dispensing with the need of one of the regenerator tubes so that the desired balanced operation will inherently always prevail. This not only results in an improved operation of the receiver and avoids any critical adjustments thereof, but additionally effects a simplification of the receiver and lowers its intial cost and cost of maintenance.

It is an object of the present invention, therefore, to provide a new and improved superregenerative receiver, adapted to receive an angular-velocity-modulated wave signal, which avoids one or more of the disadvantages and limitations of prior such receivers.

It is a further object of the invention to provide a new and improved superregenerative receiver, for receiving an angular-velocity-modulated wave signal, which possesses the desirable characteristics last mentioned.

It is an additional object of the invention to provide a superregenerative receiver, for receiving an angular-velocity-modulated wave signal, of simplified and improved construction and one having substantially improved stability of operation.

In accordance with a particular form of the invention, a superregenerative receiver for receiving an angular-velocity-modulated wave signal having modulation components which vary the frequency of the wave signal over a predetermined frequency range comprises a single regenerative circuit adapted to have an angular-velocity-modulated wave signal applied thereto and including a single regenerator tube, and means for quenching the circuit during each of successive operating periods to provide superregeneration. The receiver includes means for causing the circuit to have throughout alternate operating periods a superregenerative frequency-response characteristic which increases with the frequency deviation of the wave signal in one direction from a predetermined frequency in the aforementioned range and to have throughout the intervening operating periods a superregenerative frequency-response characteristic which increases with the frequency deviation of the wave signal in the opposite direction from the predetermined frequency, and means responsive to the signal outputs of the circuit during the aforementioned successive operating periods for deriving the modulation components of the wave signal.

For a better understanding of the present invention, together with other and further objects thereof, reference is had to the following description taken in connection with the accompanying drawing, and its scope will be pointed out in the appended claims.

Referring now to the drawing, Fig. 1 is a circuit diagram of a complete superregenerative receiver, for receiving an angular-velocity-modulated wave signal, embodying the present invention in a particular form; Fig. 2 is a circuit diagram of a complete superregenerative receiver of the type mentioned but embodying a modified form of the invention; and Figs. 3a, 3b, and 3c graphically represent certain operating characteristics of the Fig. 2 receiver and are used as an aid in explaining the operation of this modified form of the invention.

Referring now more patricularly to Fig. 1 of the drawing, the complete superregenerative receiver having the circuit diagram there represented is adapted to receive an angular-velocity-modulated wave signal, for example a frequency-modulated wave signal, having modulation components which vary the frequency of the wave signal over a predetermined frequency range. The receiver includes a single regenerative circuit adapted to have a frequency-modulated wave signal applied thereto and including a single tuned circuit normally resonant at a frequency lying to one side of the mean frequency of the applied wave signal. This regenerative circuit, identified by the reference numeral 10, includes a vacuum tube 11 having input electrodes including a control electrode 12 and cathode 13 coupled to the single tuned circuit mentioned. The latter comprises an inductor 14 and shunt-connected condenser 15 shown in broken lines for the reason that it may be comprised in whole or in part of the inherent interelectrode capacitances of the tube 11 and associated wiring capacitance. A tuning slug 16 axially movable of the inductor 14 is preferably provided for tuning purposes. The slug 16 is of conventional construction and may, for example, comprise a conductive sleeve or a compressed cylinder of powdered iron held together by a suitable dielectric binder. The regenerative circuit includes an inductor 17 inductively coupled in regenerative relation to the inductor 14. The inductor 17 is coupled to an anode 19 provided in tube 11 and is coupled through a condenser 18 to the cathode 13 of the latter. The control electrode 12 of the tube 11 has a negative operating bias applied thereto through a radio-frequency choke coil 32 from a bias source B.

The regenerative circuit just described is coupled through a conventional wave-signal amplifier 20 to an antenna system 21, 21. The amplifier 20 is of the cathode-input type and includes an input transformer 22 having a secondary winding 23 tuned by a condenser 24, shown in broken lines for the reason that it may be comprised in whole or in part of the distributed and interelectrode capacitances of the amplifier 20. The tuned circuit 23, 24 is resonant at the frequency of a desired wave signal or may be broadly resonant at the center of a wave-signal frequency band which includes a plurality of wave signals to be received.

The superregenerative receiver also is provided with means including an oscillator for quenching the regenerative circuit 10 during each of successive operating periods to provide superregeneration. This means comprises a quench oscillator 25, of conventional circuit arrangement, having the input electrodes of a triode vacuum tube 26 coupled to a parallel resonant circuit comprising an inductor 27 and the condenser 18. The tuned circuit 18, 27 is resonant at the quench frequency. The oscillatory potentials developed across the tuned circuit 18, 27 are applied through the inductor 17 of the regenerator tube 11 to the anode 19 of this tube to provide anode energization. The control electrode of tube 26 is coupled to the cathode thereof through a grid resistor 28.

The superregenerative receiver also includes means for periodically changing during successive operating periods the resonant frequency of the resonant circuit 14, 15 to opposite sides of the mean frequency of an applied wave signal. While these operating periods may each include several quench periods, in the arrangement shown the receiver comprises means responsive to the quenching oscillations generated by oscillator 25 for changing the resonant frequency during alternate quench periods. By this means the regenerative circuit 10 is caused to have throughout alternate quench periods a supperregenerative frequency-response characteristic which increases with the frequency deviation of the received wave signal in one direction from the aforementioned mean frequency and to have throughout the intervening quench periods a superregenerative frequency-response characteristic which increases with the frequency deviation of the wave signal in the opposite direction from such mean frequency. In particular, the tuned circuit 14, 15 is normally resonant at a frequency lying to one side of the mean frequency of an applied wave signal and the last-mentioned means shifts the tuning of the resonant circuit during alternate quench periods to a frequency lying on the opposite side of the wave-signal mean frequency. The normal resonant frequency of the tuned circuit 14, 15 and its periodically shifted resonant frequency preferably are equally spaced from such mean frequency.

The means last mentioned comprised an oscillator 34 of the relaxation-oscillator type having a pair of triode vacuum tubes 35 and 36 included in a conventional relaxation-oscillator circuit arrangement. As will presently become apparent, the tube 35 is used as a reactor tube to effect the aforementioned shift of resonant frequency of the tuned circuit 14, 15. The anode of tube 26 of the quench oscillator 25, which is energized from an anode-potential supply indicated as +B, is coupled to the anode of tube 35 of oscillator 34 through a resistor 37 and a radio-frequency choke coil 38 used to isolate the resistor 37 from the tuned circuit 14, 15 and damping of the latter by the resistor. The anode of tube 26 is likewise coupled to the anode of tube 36 of the oscillator 34 through a resistor 39. This circuit connection is such that the quench oscillations developed by the oscillator 25 are applied to the control electrodes of tubes 35 and 36 to ensure that the operation of the relaxation oscillator 34 is synchronized by that of the quench oscillator 25. The anode and cathode elements of tube 35 of oscillator 34 are coupled across the resonant circuit 14, 15 of the regenerative circuit 10 and the input electrodes of tube 35 are coupled thereto by a phase-shifting network to cause the tube 35 to simulate, in well-known manner, a reactive impedance. This phase-shifting network comprises a series circuit including a blocking condenser 40 and a resistor 41 coupled between the anode and control electrode of tube 35 and a condenser 42 coupled between the control electrode and cathode of this tube. Cathode resistors 43 and 44 are provided for the respective tubes 35 and 36 for a purpose presently to be explained.

The superregenerative receiver additionally includes means responsive to the signal output of the regenerative circuit 10 during the successive operating periods thereof for deriving the modulation components of the wave signal applied to the regenerative circuit. This means comprises a pair of wave-signal detectors 45, 46 of the diode type which are coupled through respective condensers 47, 48 across the resonant circuit 14, 15 and are provided with respective load resistors 49, 50. The cathode resistor 43 is included in the cathode circuit of the diode detector 45 and the cathode resistor 44 is similarly included in the cathode circuit of the diode detector 46. The circuit arrangement in this regard ensures that the relaxation oscillator 34 shall so control the detectors 45 and 46 as to cause the latter alternately to detect signal outputs from the regenerative circuit 10 in synchronism with the quenching of the regenerative circuit by the quenching oscillator 25.

The last-mentioned means also includes means for differentially combining the detected signal outputs to derive the modulation components of the wave signal applied to the regenerative circuit 10. This means comprises a differential connection of the detector load resistors 49 and 50 and the provision of a push-pull audio-frequency amplifier 51 coupled thereto. The amplifier 51 includes a vacuum tube 52 having input electrodes coupled to the load resistor 49 through a filter network comprising a series resistor 53 and a shunt condenser 54, and includes a vacuum tube 55 having input electrodes coupled to the load resistor 50 through a filter network comprising a series resistor 56 and a shunt condenser 57. It is the purpose of the filter networks 53, 54 and 56, 57 to provide suitable de-emphasis required for fidelity of reproduction of a received frequency-modulated wave signal in conventional manner. The output electrodes of tubes 52 and 55 are coupled in push-pull relation through an output transformer 58 to a loudspeaker 59 for reproduction of the derived modulation components of the received wave signal.

Considering now the operation of the superregenerative receiver just described, a received frequency-modulated wave signal is applied through the amplifier 20 to the regenerative circuit 10. This circuit is periodically quenched during each of successive operating periods by the oscillations generated by the quench oscillator 25 to provide superregeneration in conventional manner. The oscillations generated by the oscillator 25 are also applied to the relaxation oscillator 34, which has the values of its circuit components so selected that it oscillates at a frequency one-half that of the quench oscillator 25. Each time that the tube 35 of the oscillator 34 becomes conductive during each oscillatory cycle of this oscillator, the tube simulates a reactive impedance as earlier mentioned and is effective to shift the resonant frequency of the resonant circuit 14, 15. The latter is normally tuned to one side of the mean frequency of the received wave signal but becomes resonant at a frequency equally spaced on the opposite side of the mean frequency of the received wave signal upon the shift of its resonant frequency by the reactor tube 35.

Since the relaxation oscillator 34 has a frequency one-half that of the quench oscillator 25, the regenerative circuit 10 is first quenched at a time when its resonant circuit 14, 15 is resonant at one side of the wave-signal mean frequency and is then quenched at a succeeding time when the resonant circuit 14, 15 has its resonant frequency shifted to the opposite side of the wave-signal mean frequency. The regenerative circuit 10 thus has during alternate operating periods a superregenerative frequency-response characteristic which increases with the frequency deviation of the received wave signal in one direction from its mean frequency and has during the intervening operating periods a superregenerative frequency-response characteristic which increases with the frequency deviation of the wave signal in the opposite direction from its mean frequency. This effectively converts the frequency modulation of the received wave signal to an amplitude modulation.

The signal outputs of the regenerative circuit 10 during the successive operating periods thereof are applied to the detectors 45 and 46. However, the latter are so controlled by the potentials developed across the cathode resistors 43, 44 during the conductive periods of their respective associated tubes 35 and 36 that the detectors 45 and 46 are caused alternately to detect signal outputs from the regenerative circuit 10. Consequently, the detector 45 detects the signal output of the regenerative circuit 10 during intervals when the vacuum tube 36 of the relaxation oscillator 34 is conductive and thus during intervals when the resonant circuit 14, 15 of the regenerative circuit operates at its normal resonant frequency. In similar manner, the detector 46 detects the signal output of the regenerative circuit 10 during intervals when the tube 35 of the relaxation oscillator 34 is conductive and effects a shift of resonant frequency of the resonant circuit 14, 15 to the opposite side of the wave-signal mean frequency as described heretofore. The signal outputs of the detectors 45 and 46 appear across their respective load resistors 49 and 50 and are differentially combined to derive the modulation components of the received wave signal. The derived components are amplified by the amplifier 51 and applied to the loudspeaker 59 for reproduction:

The inductive tuning of the resonant circuit 14, 15 by the tuning slug 16 is of particular advantage where the regenerative circuit 10 is to be tuned over a band of wave-signal frequencies. That is, the use of a tuning slug has the advantage that the value of capacitance of the resonant circuit 14, 15 remains substantially constant over the tuning band of the regenerative circuit, thus to maintain more nearly constant the superregenerative gain of the regenerative circuit with tuning.

The wave-signal amplifier 20 of the present arrangement is useful largely to reduce radiation from the antenna system 21, 21 of the high-frequency oscillatory energy generated by the regenerative circuit 10 during normal operation thereof. Consequently, the amplifier 20 may be dispensed with where such radiation is not detrimental to the operation of nearby wave-signal receivers.

Fig. 2 is a circuit diagram representing a modified form of the invention essentially similar to that of Fig. 1, similar elements being designated by similar reference numerals and analogous elements by similar reference numerals primed. In the present arrangement, the multivibrator 34' is of conventional circuit arrangement and utilizes a pentode vacuum tube 62 having a first control electrode coupled to the junction between the resistor 41 and the condenser 42 of the phase-shifting network, a second control electrode coupled through the resistor 39' to the anode of the vacuum tube 26 of the quench oscillator 25, a third control electrode coupled to the second control electrode through a resistor 63 and a condenser 64 and connected to ground through a resistor 65, and an anode energized through the radio-frequency choke coil 38 and a winding 66 from a source of potential indicated as +B. A single diode detector 67 is utilized in the present arrangement, the diode being coupled across the resonant circuit 14, 15 of the regenerative circuit 10 and having a diode load resistor 68. A resonant circuit 69, having a resonant frequency equal to that of the multivibrator 34', is coupled in series with an isolating resistor 70 across the diode load resistor 68. A vacuum tube 71 has input electrodes coupled across the resonant circuit 69 and there is provided in the series cathode circuit of this tube a cathode resistor 72 and parallel-connected condenser 73 together with a resonant circuit 74 which is coupled to the anode inductor 66 and is resonant at the frequency of oscillation of the multivibrator 34'. A switch 75 is connected across a portion of the cathode resistor 72 to change the bias of the tube 71 upon closure of the switch for a purpose presently to be explained. The output circuit of the vacuum tube 71 is selectively coupled through a switch 76 either to the input circuit of the amplifier 51 or to the input circuit of an amplitude-modulation receiver 77. The switches 75 and 76 are mechanically connected for unicontrol operation as indicated by the broken line.

The operation of this modified form of the invention will now be considered for the assumed condition, that the switch 75 is open and the switch 76 closed to the position shown. As in the arrangement of Fig. 1, the operation of the multivibrator 34' is synchronized by that of the quenching oscillator 25. Accordingly, the multivibrator 34' shifts the resonant frequency of the resonant circuit 14, 15 during alternate quench periods. Referring to the curves of Figs. 3a, 3b and 3c, Fig. 3a represents the operating conditions prevailing under the assumed condition that the received wave signal has a constant frequency more nearly that of the normal resonant frequency of the resonant circuit 14, 15 than it has to the frequency of this circuit when shifted by the multivibrator 34'. Curve A represents the amplitude of the oscillations which are developed in the resonant circuit 14, 15 by the superregenerative action of the circuit 10 during each of three successive quench cycles, the first of which occurs when the resonant circuit 14, 15 is resonant at its normal resonant frequency. These oscillations are rectified by the detector 67 to develop across its load resistor 68 a unidirectional potential having the wave form represented by curve B. This unidirectional potential is applied through the isolating resistor 70 to the resonant circuit 69 which derives therefrom the oscillatory component thereof having a period twice that of the quench period or, in other words, an oscillatory component having a period equal to that of the multivibrator 34'. This oscillatory component, which is graphically represented by curve C, is applied to the input electrodes of the vacuum tube 71. The oscillations generated by the multivibrator 34' are coupled by the anode inductor 66 to the resonant circuit 74. There is consequently also applied to the input electrodes of vacuum tube 71 oscillations developed in the resonant circuit 74, which oscillations have constant amplitude and a frequency equal to the oscillatory frequency of the multivibrator 34'. These applied oscillations are represented by curve D. The oscillatory component applied to the tube 71 from the resonant circuit 69 and the oscillations simultaneously applied to this tube from the resonant circuit 74 are effectively combined in the input circuit of the tube 71. The relative phase of the oscillatory component and the last-mentioned oscillations is selected such that they are combined in opposite phase to develop in the input circuit of tube 71 oscillations of smaller amplitude as represented by curve E. The tube 71 is biased by the cathode resistor 72 and condenser 73 to a point on its operating characteristic such that the tube 71 rectifies the resultant signal applied to its input electrodes and applies the rectified signal to the audio-frequency amplifier 51.

Fig. 3b represents the same operating conditions of the receiver but under a second assumption that the applied wave signal has a constant frequency midway between the resonant frequencies to which the resonant circuit 14, 15 is periodically tuned by the action of the multivibrator 34'. As will be evident from curve A', the output signal of the regenerative circuit 10 is the same during successive quench periods under the present assumed condition and there is thus derived by the detector 67 an output potential, represented by curve B', having pulses of uniform amplitude. Since this unidirectional potential has no component of frequency corresponding to that of the resonant circuit 69, no oscillatory component is developed across the latter, as represented by the horizontal line C'. There is thus applied to the input circuit of the vacuum tube 71 only the oscillations developed across the resonant circuit 74 and represented by curve D' so that the resultant input signal of this tube has the wave form represented by curve E'.

Fig. 3c represents the operating conditions under a third assumed condition that the applied wave signal has a constant frequency more nearly that of the resonant circuit 14, 15 during those intervals when the frequency of this circuit is shifted by operation of the multivibrator 34'. Under this assumed condition, the oscillations developed across the resonant circuit 14, 15 have amplitudes during successive quench periods as represented by curve A''. The unidirectional potential developed across the diode load resistor 68 then has the wave form represented by curve B'' and the oscillatory component developed across the resonant circuit 69 has the wave form represented by curve C''. The oscillations applied to the input electrodes of vacuum tube 71 from the resonant circuit 74, and represented by curve D'', now effectively combine in additive phase with the oscillatory component applied to this tube from the resonant circuit 69 so that the signal applied to the input electrodes has a larger amplitude, as represented by curve E'', than was the case under the first and second assumed operating conditions.

It will be apparent from the foregoing discussion of the operation prevailing under the several assumed values of the received wave-signal frequency that there is applied to the input electrodes of tube 71 a signal having a frequency equal to that of the multivibrator 34' but amplitude-modulated in accordance with the frequency modulation of the received wave signal. In this regard, the oscillatory component developed across the resonant circuit 69 effectively comprises the balanced side bands of the amplitude-modulated signal last mentioned, the carrier component for these side bands being absent. The oscillations developed across the resonant circuit 74 effectively comprise the carrier component of such signal so that the tube 71 combines the carrier component with the balanced side bands to derive the amplitude-modulated signal mentioned. This amplitude-modulated signal is detected by the tube 71 and the amplitude-modulation components are applied to the audio-frequency amplifier 51 wherein they are amplified and applied to the loudspeaker 59 for reproduction.

Upon operation of the switch 75 to its closed-circuit position, a portion of the cathode resistor 72 is removed from circuit and the bias developed across the remainder of the resistor 72 is such as to cause the tube 71 now to operate simply as an amplifier or repeater device to translate the amplitude-modulated signal last mentioned. At the same time that the switch 75 is moved to its closed-circuit position, the switch 76 is moved to close its lower contact and thereby couple the output circuit of tube 71 to the input circuit of the amplitude-modulation receiver 77. The amplitude-modulation signal repeated by the tube 71 may thus be additionally amplified by the receiver 77, and the amplitude-modulation components thereof be derived and amplified by the latter unit and applied to the sound reproducer for reproduction.

It will be evident from the above description of the invention that a superregenerative receiver embodying the invention has the important advantage that only one regenerator tube is employed so that balanced output of the regenerative circuit is readily maintained at the mean frequency of a received wave signal without the need of any critical adjustments to attain and maintain such balanced operation as heretofore necessary where two regenerator tubes are employed. The superregenerative receiver of the present invention has the additional advantage that it is of simplified and improved construction and is one having substantially improved stability of operation. These desirable characteristics result directly from the use of a single regenerative circuit effectively operated as two such circuits and by the use of a single synchronized oscillator of the multivibrator type to perform the dual function of controlling both the detection process and the periodic detuning of the single regenerative circuit.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A superregenerative receiver for receiving an angular-velocity-modulated wave signal having modulation components which vary the frequency of said wave signal over a predetermined frequency range comprising, a single regenerative circuit adapted to have said wave signal applied thereto and including a single regenerator tube, means for quenching said circuit during each of successive operating periods to provide superregeneration, means for causing said circuit to have throughout alternate operating periods a superregenerative frequency-response characteristic which increases with the frequency deviation of said wave signal in one direction from a predetermined frequency in said range and to have throughout the intervening operating periods a superregenerative frequency-response characteristic which increases with the frequency deviation of said wave signal in the opposite direction from said predetermined frequency, and means responsive to the signal outputs of said circuit during said successive operating periods for deriving the modulation components of said wave signal.

2. A superregenerative receiver for receiving an angular-velocity-modulated wave signal having modulation components which vary the frequency of said wave signal over a predetermined frequency range comprising, a single regenerative circuit adapted to have said wave signal applied thereto and including a single resonant circuit and a single regenerator tube, means for quenching said circuit during each of successive operating periods to provide superregeneration, means responsive to said quenching means for periodically changing the resonant frequency of said resonant circuit to cause said regenerative circuit to have throughout alternate operating periods a superregenerative frequency-response characteristic which increases with the frequency deviation of said wave signal in one direction from a predetermined frequency in said range and to have throughout the intervening operating periods a superregenerative frequency-response characteristic which increases with the frequency deviation of said wave signal in the opposite direction from said predetermined frequency, and means responsive to the signal outputs of said circuit during said successive operating periods for deriving the modulation components of said wave signal.

3. A superregenerative receiver for receiving an angular-velocity-modulated wave signal having modulation components which vary the frequency of said wave signal over a predetermined frequency range comprising, a single regenerative circuit adapted to have said wave signal applied thereto and including a single regenerator tube and a single resonant circuit normally tuned to a frequency lying to one side of the mean frequency of said wave signal, means for quenching said circuit during each of successive operating periods to provide superregeneration, means responsive to said quenching means for tuning said resonant circuit throughout alternate operating periods to a frequency lying on the other side of said mean frequency to cause said regenerative circuit to have throughout said alternate periods a superregenerative frequency-response characteristic which increases with the frequency deviation of said wave signal in one direction from said mean frequency and to have throughout the intervening operating periods a superregenerative frequency-response characteristic which increases with the frequency deviation of said wave signal in the opposite direction from said mean frequency, and means responsive to the signal outputs of said circuit during said successive operating periods for deriving the modulation components of said wave signal.

4. A superregenerative receiver for receiving an angular-velocity-modulated wave signal having modulation components which vary the frequency of said wave signal over a predetermined frequency range comprising, a single regenerative circuit adapted to have said wave signal applied thereto and including a single regenerator tube, means for quenching said circuit during each of successive operating periods to provide superregeneration, an oscillator having a synchronizing circuit coupled to said quenching means for synchronization thereby, means including said oscillator for controlling said circuit to cause said circuit to have throughout alternate operating periods a superregenerative frequency-response characteristic which increases with the frequency deviation of said wave signal in one direction from a predetermined frequency in said range and to have throughout the intervening operating periods a superregenerative frequency-response characteristic which increases with the frequency deviation of said wave signal in the opposite direction from said predetermined frequency, and means responsive to the signal outputs of said circuit during said successive operating periods for deriving the modulation components of said wave signal.

5. A superregenerative receiver for receiving an angular-velocity-modulated wave signal having modulation components which vary the frequency of said wave signal over a predetermined frequency range comprising, a single regenerative circuit adapted to have said wave signal applied thereto and including a single regenerator tube, means for quenching said circuit during each of successive operating periods to provide superregeneration, means for causing said circuit to have throughout alternate operating periods a superregenerative frequency-response characteristic which increases with the frequency deviation of said wave signal in one direction from a predetermined frequency in said range and to have throughout the intervening operating periods a superregenerative frequency-response characteristic which increases with the frequency deviation of said wave signal in the opposite direction from said predetermined frequency, and means for differentially combining the alternate operation-period signal outputs of said circuit with the intervening operation-period signal outputs thereof to derive the modulation components of said wave signal.

6. A superregenerative receiver for receiving an angular-velocity-modulated wave signal having modulation components which vary the frequency of said wave signal over a predetermined frequency range comprising, a single regenerative circuit adapted to have said wave signal applied thereto and including a single regenerator tube, means for quenching said circuit during each of successive operating periods to provide superregeneration, means for causing said circuit to have throughout alternate operating periods a superregenerative frequency-response characteristic which increases with the frequency deviation of said wave signal in one direction from a predetermined frequency in said range and to have throughout the intervening operating periods a superregenerative frequency-response characteristic which increases with the frequency deviation of said wave signal in the opposite direction from said predetermined frequency, a pair of wave-signal detectors individually coupled to said regenerative circuit, means for controlling said detectors alternately to detect signal outputs from said regenerative circuit in synchronism with the operating periods of said regenerative circuit as controlled by said quenching means, and means for differentially combining said detected signal outputs to derive the modulation components of said wave signal.

7. A superregenerative receiver for receiving an angular-velocity-modulated wave signal having modulation components which vary the frequency of said wave signal over a predetermined frequency range comprising, a single regenerative circuit adapted to have said wave signal applied thereto and including a single regenerator tube, means for quenching said circuit during each of successive operating periods to provide superregeneration, a relaxation oscillator having an operation synchronized by that of said quenching means, means for utilizing said oscillator to control the tuning of said circuit to cause said circuit to have throughout alternate operating periods a superregenerative frequency-response characteristic which increases with the frequency deviation of said wave signal in one direction from a predetermined frequency in said range and to have throughout the intervening operating periods a superregenerative frequency-response characteristic which increases with the frequency deviation of said wave signal in the opposite direction from said predetermined frequency, a pair of wave-signal detectors individually coupled to said regenerative circuit, means for utilizing said oscillator to control said detectors alternately to detect signal outputs from said regenerative circuit in synchronism with the operating periods of said regenerative circuit as controlled by said quenching means, and means for differentially combining said detected signal outputs to derive the modulation components of said wave signal.

8. A wave-signal receiver for receiving an angular-velocity-modulated wave signal having modulation components which vary the frequency of said wave signal over a predetermined frequency range comprising, a single regenerative circuit, including a single regenerator tube, adapted to have said wave signal applied thereto, means for quenching said circuit during each of successive operating periods to provide superregeneration, means for causing said circuit to have throughout alternate operating periods a superregenerative frequency-response characteristic which increases with the frequency deviation of said wave signal in one direction from a predetermined frequency in said range and to have throughout the intervening operating periods a superregenerative frequency-response characteristic which increases with the frequency deviation of said wave signal in the opposite direction from said predetermined frequency, means for detecting the signal outputs of said circuit during said successive operating periods and for deriving from said detected outputs the oscillatory component thereof which has a period twice that of said operating period, means for deriving oscillations synchronized with said operating periods but having an oscillation period twice that of said operating period, and means responsive simultaneously to said derived oscillatory component and said oscillations for deriving a signal amplitude-modulated in accordance with the angular-velocity modulation of said wave signal.

9. A superregenerative receiver for receiving an angular-velocity-modulated wave signal having modulation components which vary the frequency of said wave signal over a predetermined frequency range comprising, a single regenerative circuit, including a single regenerator tube adapted to have said wave signal applied thereto, means for quenching said circuit during each of successive operating periods to provide superregeneration, means for causing said circuit to have throughout alternate operating periods a superregenerative frequency-response characteristic which increases with the frequency deviation of said wave signal in one direction from a predetermined frequency in said range and to have throughout the intervening operating periods a superregenerative frequency-response characteristic which increases with the frequency deviation of said wave signal in the opposite direction from said predetermined frequency, means for detecting the signal outputs of said circuit during said successive operating periods and for deriving from said detected outputs the oscillatory component thereof which has a period twice that of said operating period, means for deriving oscillations synchronized with said operating periods but having an oscillation period twice that of said operating period, and means responsive simultaneously to said derived oscillatory component and said oscillations for deriving the modulation components of said wave signal.

10. A superregenerative receiver for receiving an angular-velocity-modulated wave signal having modulation components which vary the frequency of said wave signal over a predetermined frequency range comprising, a single regenerative circuit, including a single regenerator tube, adapted to have said wave signal applied thereto, means for quenching said circuit during each of successive operating periods to provide superregeneration, means for causing said circuit to have throughout alternate operating periods a superregenerative frequency-response characteristic which increases with the frequency deviation of said wave signal in one direction from a predetermined frequency in said range and to have throughout the intervening operating periods a superregenerative frequency-response characteristic which increases with the frequency deviation of said wave signal in the opposite direction from said predetermined frequency, means for detecting the signal outputs of said circuit during said successive operating periods and for deriving from said detected outputs the oscillatory component thereof which has a period twice that of said operating period, means for deriving oscillations synchronized with said operating periods but having an oscillation period twice that of said operating period, and means for effectively combining said derived oscillatory component and said oscillations to derive the modulation components of said wave signal.

BERNARD D. LOUGHLIN.

REFERENCES CITED

The following references are of record in the file of this patent:

UNITED STATES PATENTS

| Number | Name | Date |
|---|---|---|
| 2,351,193 | Crosby | June 13, 1944 |
| 2,410,981 | Koch | Nov. 12, 1946 |
| 2,416,794 | Crosby | Mar. 4, 1947 |
| 2,428,265 | Crosby | Sept. 30, 1947 |